(12) United States Patent
Chung et al.

(10) Patent No.: US 6,596,062 B2
(45) Date of Patent: Jul. 22, 2003

(54) COATING COMPOSITION FOR PASSIVATING FILM WITH EXCELLENT CORROSION RESISTANCE

(75) Inventors: Bum-Goo Chung, Kyoungki-Do (KR); Kwang-Wha Hong, Incheon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/072,847

(22) Filed: Feb. 6, 2002

(65) Prior Publication Data

US 2002/0146514 A1 Oct. 10, 2002

(30) Foreign Application Priority Data

Feb. 8, 2001 (KR) .......................................... 2001-6241

(51) Int. Cl.$^7$ ............................................. C23C 22/05
(52) U.S. Cl. ................................. 106/14.11; 106/14.41; 106/14.44; 148/267; 427/383.3; 427/405; 427/406; 427/419.1
(58) Field of Search ............................ 106/14.11, 14.41, 106/14.44; 148/267; 427/383.3, 405, 406, 419.1

(56) References Cited

U.S. PATENT DOCUMENTS

| 4,028,116 A | * | 6/1977 | Cedarleaf .................. 106/1.22 |
| 4,892,628 A | * | 1/1990 | Guilinger ................... 205/243 |
| 5,131,948 A | * | 7/1992 | Higashiyama et al. ... 106/14.14 |
| 5,597,465 A | * | 1/1997 | Pedrazzini .................. 204/486 |
| 6,149,735 A | * | 11/2000 | Oue et al. .................... 148/267 |

FOREIGN PATENT DOCUMENTS

JP   8-319577   * 12/1996

OTHER PUBLICATIONS

*http://www.n–d–s.co.jp/english/dacro–a.htm*—Structure and corrosion preventive mechanism (Structure of Dacrotized™ film) (accessed Dec. 12, 2001).

* cited by examiner

*Primary Examiner*—Anthony J. Green
(74) *Attorney, Agent, or Firm*—Pennie & Edmonds LLP

(57) ABSTRACT

Disclosed is a coating composition for DACROTIZED™ film comprising Cr-containing inorganic acid, Ni carbonate, reductant, surfactant and water which has excellent corrosion resistance, weather resistance and chemical resistance thus being widely applicable to anticorrosion treatments of metals such as various alloys, sintering metals, and the like.

16 Claims, No Drawings

COATING COMPOSITION FOR PASSIVATING FILM WITH EXCELLENT CORROSION RESISTANCE

FIELD OF THE INVENTION

The present invention relates to a coating composition for DACROTIZED™ film with excellent corrosion resistance, and more particularly, to a coating composition for DACROTIZED™ film with excellent corrosion resistance comprising Cr-containing inorganic acid, Ni carbonate, reductant, surfactant and water as a dispersion medium which has excellent corrosion resistance, weather resistance and chemical resistance when coated on DACROTIZED™ film, thus being widely applicable to anticorrosion treatments of steel, metals such as various alloys, sintering metals, and the like.

BACKGROUND OF THE INVENTION

DACRO™ was first developed by Diamond Shamrock Co., Ltd. (USA) in 1990 and has been distributed worldwide by Nippon Diamond Shamrock Co., Ltd. Japan) after making further improvement and has been applied since in numerous industrial fields such as automobiles, civil engineering, construction and the like where metal treatments to give corrosion resistance are considered essential.

DACRO™ is an aqueous solution comprising zinc in flake phase, aluminum metal powder and inorganic compound. DACRO™ is normally treated by dip- and spin-coating of this aqueous solution of DACRO™ followed by heat-treatment at a relatively high, i.e., about 300 C., temperature. As a result, 7–8 μm thick coating is formed by drying and curing during the hot air drying process. Chromic acid of DACRO™ composition is reduced to a polymer of $mCr_2O_3nCrO_3$ during the heat treatment thus chrominating the surface of metal zinc which forms laminated coating. Metal zinc and aluminum, which constitute the coated film, can protect steel via self-sacrificing, namely, by inhibiting the corrosion of a given steel due to the electric activity of highly ionizable metal zinc. Here, the chromic acid in a polymerized state can control and inhibit the self-sacrificing of metal zinc thus serving the role of a binder while also establishing the passivation of coating, which then leads to inhibition of chemical reaction between zinc and iron and accordingly reduces the speed of corrosive progress, thus exhibiting high corrosion resistance. In addition, the zinc, aluminum flake and metal oxide, which are of multi-layered structures, can protect the surface of iron alternatively thus functioning as a barrier against external corrosive factors thereby exhibiting superiority in corrosion resistance.

The process of DACRO™ treatment consists of steps of degreasing, desealing, coating (dipping and spinning), heat curing, and the process of coating and heat curing is repeated once. DACRO™ is provided in two different colors of white and black and it is extensively applied to the conventional hardwares at present. As used herein, the term "DACROTIZED™ film" means at least one film of DACRO™ applied over a substrate and cured as is known to those of skill in the art. Such a film comprises zinc particles and a trivalent chromium polymer in a laminated form. By "laminated" it is not meant that the zinc particles and the trivalent chromium polymer form continuous layers disposed one over another, but rather that the trivalent chromium polymer forms a matrix that includes zinc particles disposed therein, and that typically exhibits a plurality of layers of trivalent chromium polymer and zinc particles when viewed in a cross-section.

The conventional white DACRO™ appears to present no significant problem during its treatment process. However, black DACRO™, due to the coating film formation by 4 coating (originally 2 coating) employed to resolve dust scatter during line assembly and to adjust anticorrosive property, result in deterioration of torque and occurrence of puddles of screw thread. Further, materials have been requested to have much improved corrosion resistance in exported countries and thus the introduction of a new powerful technique to serve this purpose is highly required.

SUMMARY OF THE INVENTION

To resolve the problem of the conventional DACRO™ coating due to the formation of post-coating via black 4 coating, the inventors of the present invention developed a coating composition particularly suited for use on top of already existing DACROTIZED™ film, as well as a method for applying the coating composition and curing the same with a heat treatment.

The coating composition comprises Cr-containing inorganic acid, a nickel-containing compound, for example Ni carbonate, a reductant, optionally a surfactant, and water. This coating composition has excellent corrosion resistance as well as chemical resistance.

Thus manufactured coating composition of the present invention can be widely used in fields of treating steel as well as metals such as various alloys and sintering metals to impart anticorrosive property; therefore, the object of the present invention is to provide a coating composition having the above-mentioned superior properties.

In one embodiment, the coating composition includes: 5% to 30% by weight of chromium-containing inorganic acid; 5% to 15% by weight of a nickel salt; 1% to 8% by weight of reductant; and water. The chromium-containing inorganic acid advantageously includes trivalent and hexavalent chromium. The chromium-containing inorganic acid reacts with the reductant at a temperature of about 300° C. to form a chromium-containing polymer, and said polymer entraps nickel-containing particles within the polymeric coating. The coating composition advantageously also includes 1% to 5% by weight of a surfactant. The nickel salt is, in a preferred embodiment, a basic nickel salt, preferably nickel carbonate at a quantity between 8% and 10% by weight. The reductant is advantageously selected from the group consisting of monovalent alcohol, divalent alcohol and oxycarboxylic acid.

The invention also includes a method for applying a passivating coating to a substrate. The methods includes coating at least a portion of the substrate with a fluid composition comprising 10% to 25% by weight of chromium-containing inorganic acid, 8% to 10% by weight of Ni carbonate, 1% to 5% by weight of reductant, optionally 2% to 4% by weight of surfactant, and water. The coating is then heated for a time and at a temperature necessary to form a solid coating on the substrate, preferably such that the coating comprising a chromium-containing polymer formed during the heating and entrained nickel-containing particles. A preferred method includes providing a second layer, for example by re-coating at least a portion of the coated substrate with a fluid composition comprising 10% to 25% by weight of chromium-containing inorganic acid, 8% to 10% by weight of Ni carbonate, 1% to 5% by weight of reductant, 2% to 4% by weight of surfactant, and water. This layer is then heated for a time and at a temperature necessary to form a second solid coating comprising a chromium-containing polymer and entrained nickel-containing particles. In some embodiments the first layer is dried, and complete polymerization occurs during the final heating step. Advantageously the substrate comprises a metallic substrate, and even more advantageously this metallic substrate is already coated with a first passivating DACRO™ coating, for example a coating with a polymeric chromium portion and metallic zinc, metallic aluminum, or both, portion, wherein said portions form a laminated first passivating coating.

DETAILED DESCRIPTION OF THE PREFERRED EMBODIMENTS

The present invention relates to a coating composition for DACROTIZED™ film with excellent corrosion resistance comprising 10–25 wt % of Cr-containing inorganic acid, 8–10 wt % of a nickel-containing compound, for example Ni carbonate, 1–5 wt % of reductant, 2–4 wt % of surfactant and water as a dispersion medium.

The present invention is explained in more detail as set forth hereunder.

The present invention beneficially is to a coating composition for DACROTIZED™ film, wherein the invention is an additional coating disposed on top of existing DACROTIZED™ film. The coating of the present invention can be disposed over other passivating films, or directly over a substrate. In a preferred embodiment, the DACROTIZED™ film is black. A DACROTIZED™ film is already known to have superior anti-corrosive property, and the invention further improves corrosion resistance along with the beauty of blackening.

The components of the coating composition of the present invention are described as follows.

The inorganic acid that contains chromium serves to improve corrosion resistance and blackening as well as adherent property of coating film, and the inorganic acid is selected from chromium compounds. The chromium-containing inorganic acids used in DACRO™ may be used. The chromium-containing inorganic acid may contain tri-valent Cr, hexa-valent Cr, or a mixture thereof. In one embodiment, the coating is believed to form a chromium-containing polymer which comprise $mCr_2O_3nCrO_3$ where m and n are independently between 1 and 10. The coating composition of the present invention contains 10% to 25 wt %, for example between 15% and 20%, of this inorganic acid. If the content is less than 10 wt %, blackening becomes unstable, while if the content is more than 25 wt %, coating film is easily exfoliated.

A nickel-containing compound is advantageously included. In one embodiment, the nickel-containing compound acts as a base, for example, nickel oxide or nickel carbonate, preferably nickel carbonate. Ni carbonate serves to form a black coating film by combining with tri-valent Cr and hexa-valent Cr, and is contained about 8–10 wt % of the total coating composition. If the content is less than 8 wt %, blackening becomes unstable while if the content is more than 10 wt %, coating film becomes easily exfoliated.

A reductant serves to form and maintain the polymerization ratio of tri-valent Cr or hexa-valent Cr, and the reductant is selected from the group consisting of monovalent alcohol, divalent alcohol and oxycarboxylic acid. The reductant is about 0.1 to about 7%, preferably 1% to 5% by weight of the total coating composition. In one embodiment, 2% to 4% of a C1 to C5 alcohol, a glycol or substituted glycol, or a mixture thereof is incorporated into the coating composition as the reductant. If the content is less than 1 wt %, a proper polymerization ratio of Cr cannot be maintained while if the content is more than 5 wt %, its role as a reductant is alleviated.

A surfactant serves to maintain the smoothness of coated film and it is selected from anionic-, cationic- and nonionic surfactants. The surfactant is contained about 0.1 to 5%, preferably between 2% and 4 wt % of the total coating composition. If the content is less than 2 wt %, the smoothness becomes deteriorated, while if the content is more than 4 wt %, the aging of a coating solution is accelerated.

The coating composition comprising the above-mentioned components is coated on top of the traditionally DACROTIZED™ film by a dip and spin coating, followed by heat treatment for 15–20 min at 260–270° C., and this coating and heat treatment is in a preferred embodiment repeated once, thus finally forming coated film.

The above coated film is about 1 to 6 µm thick, typically 2 to 5 µm thick, for example 3–4 µm thick. The DACRO™ film is typically about 1 to 8 µm thick. Multiple coatings will provide additional thickness, for example two coating of the composition of the invention over a DACRO™ film may form a film of thickness of 12 µm after the second heat treatment. The metal salt present in the interface of DACROTIZED™ film turns into black during the heat treatment. The coated film of the present invention has an excellent corrosion resistance along with chemical resistance, therefore, it can be widely used in treating steels as well as metals such as various alloys and sintering metals for the purpose of giving corrosion resistance.

Hereunder is given a detailed description of the present invention using the following examples, however, it should not be construed as limiting the scope of the present invention.

EXAMPLE 1

A coating composition comprising 25 wt % of Cr-containing inorganic acid, 9 wt % of Ni carbonate, 2 wt % of reductant (95% monovalent alcohol, Daehan Resin Chemical Co., Ltd.), 3 wt % of surfactant (>90% nonionic, Degussa, Germany) and water was prepared, coated on top of DACROTIZED™ film and then placed under heat treatment twice at 260° C. The physical properties of thus prepared coating composition were measured and are shown in the following table 1. Corrosion resistance was measured according to KS 9502 (Korea Standard Salt Spray Test) and weather resistance was measured by exposure test performed for 1.5 year in a building rooftop of a foundry located in an industrial complex in Busan, Korea, where the level of air pollution is known to be very serious. Chemical resistance was measured by dipping test in aqueous solutions of 5% HCl, 5% $H_2SO_4$ and 20% NaOH, respectively.

COMPARATIVE EXAMPLE 2

Physical properties were measured for only DACROTIZED™ film which was not added with the coating composition of the present invention.

EXAMPLE 3

Physical properties were measured by using the coating composition of Example 1. However, the coating and heat treatment were performed only once.

As shown in the Table 1, the corrosion resistance, weather resistance and chemical resistance of the coating composition of the present invention were apparently shown to be superior to those of comparative examples 2. The treatment with two coating of the present invention, with an intervening heat treatment, was preferable over a treatment including only a single coating of the composition of the present invention.

TABLE 1

| Classification | Example | Comparative Example 2 | Example 3 |
|---|---|---|---|
| Thickness (μm) | 11–12 | 6–7 | 8–9 |
| Corrosion resistance | No red rust at 1200 hr | Red rust at 560 hr | No red rust at 1200 hr |
| Weather resistance | No change at 1.5 year | Much white rust at 1 year + little red rust | No change at 1.5 year |
| Chemical resistance | No change at 35 min | Swelling and exfoliation within 5 min | Exfoliation at 35 mm |
| Physical appearance | Black | Silver white | Presence of both reddish yellow and dark brown |

Consequently, the present invention relates to a coating composition comprising inorganic acid, Ni carbonate, reductant, surfactant and water which is coated on top of already existing DACROTIZED™ film followed by heat treatment, wherein this coating and heat treatment is repeated once. Thus produced coated film of the present invention is shown to have excellent corrosion resistance, weather resistance and chemical resistance along with improved beauty of blackening and therefore can be intensively applied to industrial fields for anticorrosive treatments of steels as well as metals such as various alloys and sintering metals.

What is claimed is:

1. A coating composition with excellent corrosion resistance comprising:
   10–25 wt % of a Cr-containing inorganic acid,
   8–10 wt % of Ni carbonate,
   1–5 wt % of a reductant,
   2–4 wt % of a surfactant selected from the group consisting of anionic-, cationic- and nonionic surfactants, and water.

2. The coating composition of claim 1, wherein the reductant is selected from the group consisting of monovalent alcohol, divalent alcohol and oxycarboxylic acid.

3. The coating composition of claim 1, wherein the surfactant is nonionic.

4. A coating composition consisting essentially of:
   5% to 30% by weight of a chromium-containing inorganic acid;
   5% to 15% by weight of a nickel salt;
   1% to 8% by weight of a reductant; and
   water, wherein the chromium-containing inorganic acid comprises trivalent chromium, hexavalent chromium, or both, the chromium-containing inorganic acid reacts with the reductant at a temperature of about 300° C. to form a chromium-containing polymer, and said chromium-containing polymer entraps nickel-containing particles within the chromium-containing polymer so that dust and undesirable amounts of metallic buildup are not formed.

5. The coating composition of claim 4, wherein the composition further includes 1% to 5% by weight of a surfactant selected from the group consisting of anionic-, cationic- and nonionic surfactants.

6. The coating composition of claim 5, wherein the nickel salt is nickel carbonate in a quantity between 8% and 10% by weight, and the reductant is selected from the group consisting of monovalent alcohol, divalent alcohol and oxycarboxylic acid.

7. A method for applying a passivating coating to a substrate, said method comprising:
   coating at least a portion of the substrate with a fluid composition comprising 10% to 25% by weight of a chromium-containing inorganic acid, 8% to 10% by weight of Ni carbonate, 1% to 5% by weight of a reductant, 2% to 4% by weight of surfactant selected from the group consisting of anionic-, cationic- and nonionic surfactants, and water;
   heating the coated substrate for a time and at a temperature necessary to form a solid coating on the substrate, said coating comprising a chromium-containing polymer and entrained nickel-containing particles.

8. The method of claim 7, wherein the process further comprises:
   re-coating at least a portion of the coated substrate with a fluid composition comprising 10% to 25% by weight of chromium-containing inorganic acid, 8% to 10% by weight of Ni carbonate, 1% to 5% by weight of reductant, 2% to 4% by weight of surfactant, and water;
   heating the coated substrate for a time and at a temperature necessary to form a second solid coating comprising a chromium-containing polymer and entrained nickel-containing particles.

9. The method of claim 7, wherein the substrate comprises a metallic substrate coated with a first passivating coating, said first passivating coating comprising a polymeric chromium portion and metallic zinc, metallic aluminum, or both, forming a laminated first passivating coating.

10. The method of claim 8, wherein the substrate comprises a metallic substrate coated with a first passivating coating, said first passivating coating comprising a polymeric chromium portion and metallic zinc, metallic aluminum, or both, forming a laminated first passivating coating.

11. The method of claim 7, wherein the chromium-containing polymer comprises $mCr_2O_3nCrO_3$ where m and n are independently between 1 and 10.

12. The method of claim 7, wherein the reductant is selected from the group consisting of monovalent alcohol, divalent alcohol and oxycarboxylic acid.

13. The method of claim 8, wherein the reductant is selected from the group consisting of monovalent alcohol, divalent alcohol and oxycarboxylic acid.

14. The method of claim 9, wherein the reductant is selected from the group consisting of monovalent alcohol, divalent alcohol and oxycarboxylic acid.

15. The method of claim 10, wherein the reductant is selected from the group consisting of monovalent alcohol, divalent alcohol and oxycarboxylic acid.

16. The method of claim 7, wherein the surfactant is nonionic.

* * * * *